United States Patent
Sugihara et al.

(10) Patent No.: US 9,091,847 B2
(45) Date of Patent: Jul. 28, 2015

(54) HEAD-MOUNTED IMAGE DISPLAY DEVICE

(71) Applicant: OLYMPUS CORPORATION, Tokyo (JP)

(72) Inventors: Ryohei Sugihara, Machida-shi, Tokyo (JP); Yoichi Iba, Hachioji-shi, Tokyo (JP); Seiji Tatsuta, Hachioji-shi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 166 days.

(21) Appl. No.: 13/792,093

(22) Filed: Mar. 10, 2013

(65) Prior Publication Data

US 2013/0182334 A1    Jul. 18, 2013

Related U.S. Application Data

(63) Continuation of application No. PCT/JP2011/001706, filed on Mar. 23, 2011.

(30) Foreign Application Priority Data

Sep. 16, 2010    (JP) .................................. 2010-208587

(51) Int. Cl.
*G02B 27/14*    (2006.01)
*G09G 5/00*    (2006.01)
(Continued)

(52) U.S. Cl.
CPC .......... *G02B 27/017* (2013.01); *G02B 27/0172* (2013.01); *G02B 6/00* (2013.01); *G02B 2027/0125* (2013.01); *G02B 2027/0154* (2013.01); *G02B 2027/0178* (2013.01)

(58) Field of Classification Search
USPC ............ 359/630, 318, 13, 632; 345/7, 8, 633; 348/14.08, 115
See application file for complete search history.

(56) References Cited

U.S. PATENT DOCUMENTS

2004/0004767 A1    1/2004    Song
2007/0058261 A1    3/2007    Sugihara et al.
(Continued)

FOREIGN PATENT DOCUMENTS

JP    2003-329968    11/2003
JP    2006-3879    1/2006
(Continued)

OTHER PUBLICATIONS

Notification of Reasons for Refusal dated Nov. 19, 2013 from related Japanese Application No. 2010-208587, together with an English language translation.
(Continued)

*Primary Examiner* — Ricky Mack
*Assistant Examiner* — Mustak Choudhury
(74) *Attorney, Agent, or Firm* — Scully, Scott, Murphy & Presser, PC

(57) ABSTRACT

Provided is a head-mounted image display device, including: a main body for emitting an image light beam; an eyepiece optical portion having a light-guide portion in a polyhedral shape, the eyepiece optical portion allowing the image light beam emitted from the main body to be incident on one surface of the light-guide portion and causing the image light beam incident on the one surface of the light-guide portion and emitted from another surface on the same side as the one surface or on the different side from the one surface; an attaching portion for connecting the main body and the eyepiece optical portion, in which the attaching portion has a movement mechanism for moving the eyepiece optical portion relative to the main body so as to adjust the position of an exit pupil of the eyepiece optical portion.

4 Claims, 13 Drawing Sheets

(51) Int. Cl.
*G02B 27/01* (2006.01)
*G02B 6/00* (2006.01)

(56) References Cited

U.S. PATENT DOCUMENTS

2009/0237804 A1* 9/2009 Amitai et al. ............... 359/630
2011/0012814 A1* 1/2011 Tanaka ........................ 345/8

FOREIGN PATENT DOCUMENTS

JP 2008-61052 3/2008
JP 2009-294605 12/2009

OTHER PUBLICATIONS

International Search Report dated Apr. 26, 2011 issued in corresponding International Application No. PCT/JP2011/001706.

* cited by examiner

FIG. 7
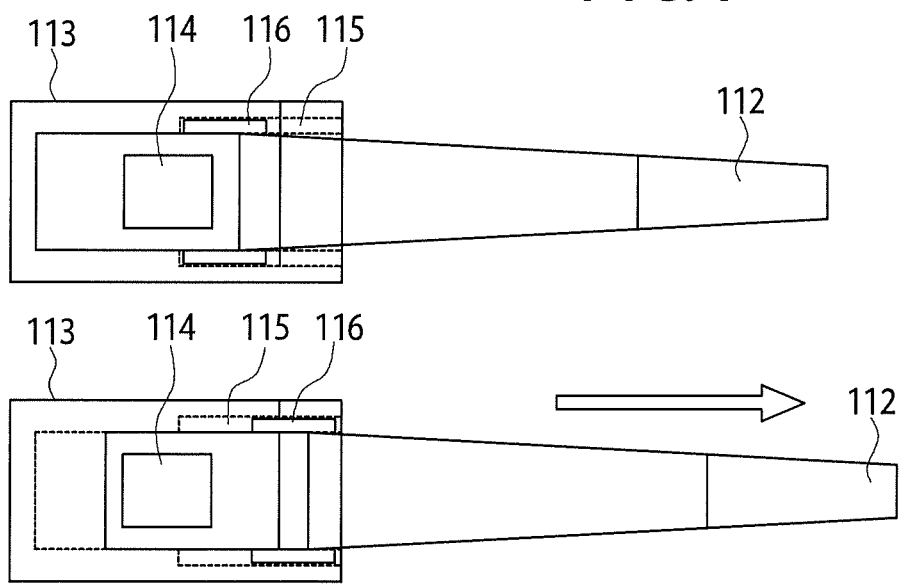
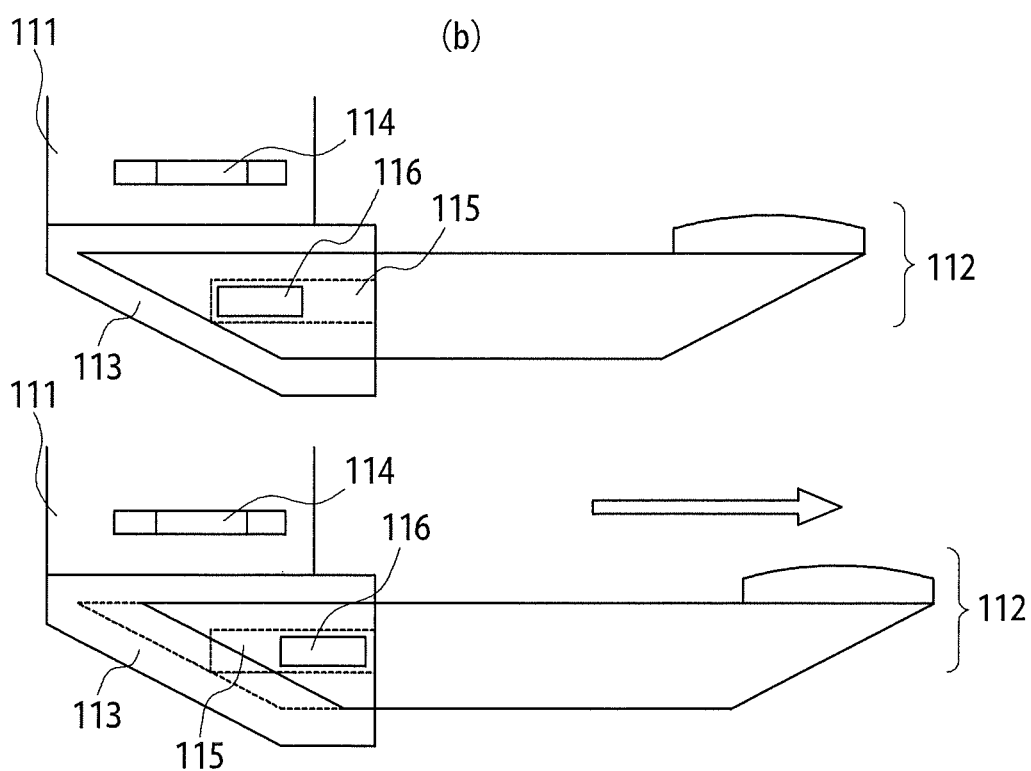

FIG. 15
(a)
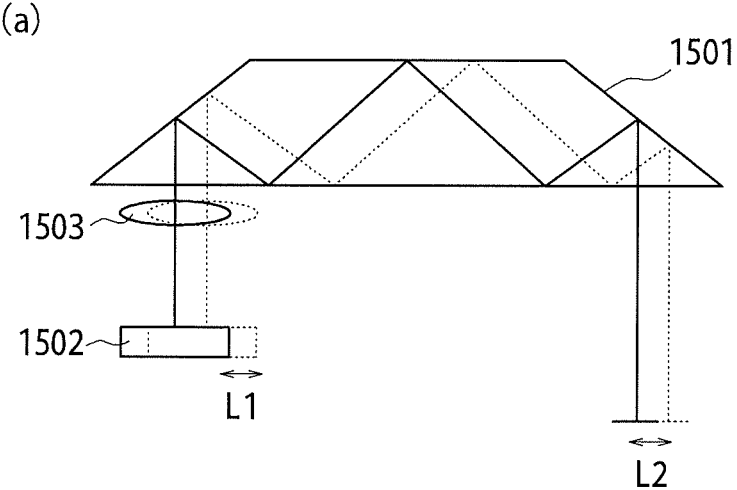
(b)
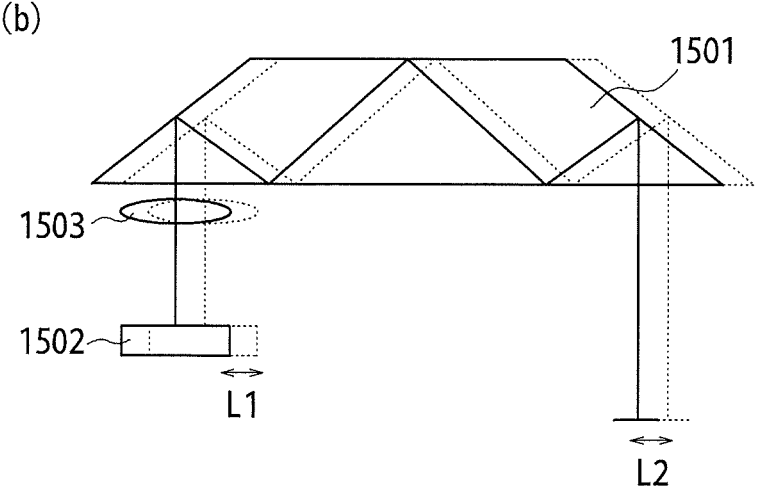

HEAD-MOUNTED IMAGE DISPLAY DEVICE

CROSS REFERENCE TO RELATED APPLICATIONS

The present application is a Continuing Application based on International Application PCT/JP2011/001706 filed on Mar. 23, 2011, which, in turn, claims the priority from Japanese Patent Application No. 2010-208587 filed on Sep. 16, 2010, the entire disclosure of these earlier applications being herein incorporated by reference.

TECHNICAL FIELD

The present invention relates to an image display device, and more particularly to a head-mounted type image display device.

BACKGROUND ART

In recent years, active development is performed on a head-mounted type image display device that can be attached to eyeglasses or the like, aiming at practical applications such as video viewing and information display for use in a mobile terminal. The device is generally referred to as "head-mounted display (HMD)", in which an image light beam from a display element is guided to an eye pupil so as to be imaged onto a retina, to thereby allow the wearer to observe the image as an enlarged virtual image.

FIG. 13 is a schematic view illustrating a configuration of a general head-mounted image display device 1310. In FIG. 13, an image light beam 1312 of an image X displayed by a display element 1311 is incident on a light-guide portion 1313 and reflected therewithin at least once before being emitted from the light-guide portion 1313. The image light beam emitted from the light-guide portion 1313 enters an eye pupil of an eyeball 1320 of a wearer to form an image onto a retina, to thereby allow the wearer to observe a virtual image X' of the image X ahead in the direction of the visual axis of the eye pupil.

The eye pupil herein refers to a portion 1402 bounded by an iris 1401 of the eyeball 1320 as illustrated in FIG. 14, and light that has passed through the portion 1402 is projected onto a retina 1403. Accordingly, in order to properly observe the whole display image, the exit pupil of the light-guide portion and the eye pupil 1402 need to be in line with each other.

However, there are individual differences in position of an eyeball and of the eye pupil of the wearer, and thus the exit pupil of the light-guide portion and the eye pupil may be misaligned, which leads to problems in that part of the image light beam does not enter the eye pupil to cause eclipse, or in that all the image light beams do not enter the eye pupil and nothing can be observed. In particular, a small-scale optical system has a relatively small exit pupil, and is more susceptible to the misalignment ascribable to the interpupillary distance of the wearer or the frame shape of the eyeglasses on which the device is to be mounted.

Patent Literature 1 (PTL 1) discloses a display device including: a combiner optical system incorporated in an eye glass lens; a display panel; and a condenser lens disposed between the display panel and the combiner optical system, in which the display panel and the condenser lens are moved together relative to the combiner optical system, or the combiner optical system, the display panel, and the condenser lens are integrally moved all together, to thereby adjust an eye point position serving as an exit pupil of the combiner optical system.

CITATION LIST

Patent Literature

PTL 1: JP 2008-61052A

SUMMARY OF INVENTION

Here, FIG. 15 schematically illustrates the aforementioned configuration, in which: FIG. 15(a) illustrates the display panel 1502 and the condenser lens 1503 which are moved together relative to the combiner optical system 1501; and FIG. 15(b) illustrates the combiner optical system 1501, the display panel 1502, and the condenser lens 1503 which are integrally moved all together. In FIG. 15, the solid line and the dotted line each illustrate the configuration and the optical path before and after the movement, respectively, in which only an optical path that is emitted from the center of the display panel 1502 and orthogonally incident on the combiner optical system 1501 is illustrated.

As illustrated in FIG. 15(a), when the display panel 1502 and the condenser lens 1503 are moved together relative to the combiner optical system 1501, a moving distance L1 of the position of the display panel 1502 and the condenser lens 1503 is the same as a moving distance L2 of the position of the exit pupil. Further, as illustrated in FIG. 15(b), even when the combiner optical system 1501, the display panel 1502, and the condenser lens 1503 are integrally moved all together, the moving distance L1 of the position of the display panel 1502, the condenser lens 1503, and the condenser lens 1503 is the same as the moving distance L2 of the position of the exit pupil.

According to the technology disclosed in PTL 1, if the exit pupil needs to be moved along a larger distance to adjust the position thereof, the moving distance of the display panel and the like is also increased. In addition, the display panel is generally disposed inside a casing (not shown) or the like, and thus requires a complicated machine mechanism to move the display panel within the casing. Further, an extensive machine mechanism is necessary to move the display panel together with the casing incorporating the display panel therewithin. Further, as illustrated in FIG. 15(a), when the display panel and the condenser lens are moved together relative to the combiner optical system, the optical system needs to have a large aperture so as to be able to guide even a light flux displaced by the movement, which leads to a fear that the device may be increased in size.

In order to obtain the device compact in size and simple in mechanism, the inventors of the present invention have tried to adjust the position of the exit pupil without moving the display element or the main body incorporating the display element, and have obtained the following findings as a result thereof. That is, there can be obtained a larger effect of adjusting the position of the exit pupil by moving, relative to the main body, an eyepiece optical portion, or the eyepiece optical portion and an eyepiece lens.

The present invention is based on the aforementioned findings, and the configuration thereof can be summarized as follows.

(1) A head-mounted image display device, including: a main body for emitting an image light beam; an eyepiece optical portion having a light-guide portion in a polyhedral shape, the eyepiece optical portion allowing the image light beam emitted from the main body to be incident on one surface of the light-guide portion and causing the image light beam incident on the one surface of the light-guide portion to be emitted from a surface on the same side as the one surface or from another surface on the different side from the one surface; an attaching portion for connecting the main body and the eyepiece optical portion, in which the attaching portion has a movement mechanism for moving the eyepiece optical portion relative to the main body to thereby adjust the position of an exit pupil of the eyepiece optical portion.

(2) The head-mounted image display device according to item (1), in which the eyepiece optical portion has, on the surface of the light-guide portion from which the image light beam is emitted, an eyepiece lens having a positive refractive power.

(3) The head-mounted image display device according to item (1) or (2), in which the light-guide portion has a positive refractive power.

(4) The head-mounted image display device according to item (1), (2), or (3), in which: the light-guide portion has an odd number of reflective surfaces; and the light-guide portion has an image light beam incident on one surface thereof and emitted from a surface on the same side as the one surface.

(5) The head-mounted image display device according to item (1), (2), or (3), in which: the light-guide portion has an odd number of reflection surfaces; and the light-guide portion has an image light beam incident on one surface thereof and emitted from another surface of the light-guide portion.

(6) The head-mounted image display device according to item (4), in which the light-guide portion is a prism having a positive refractive power.

(7) The head-mounted image display device according to any one of items (1) to (6), in which the eyepiece optical portion is smaller in width of a projected cross section in the direction of the visual axis of a wearer wearing the device, than a pupil of an eyeball of the wearer.

BRIEF DESCRIPTION OF DRAWINGS

The present invention will be further described below with reference to the accompanying drawings, wherein:

FIG. 7 each are a schematic view illustrating an attaching portion connecting a main body and an eyepiece optical portion;

FIG. 15 each are a schematic view illustrating a mechanism of a conventional head-mounted image display device.

DESCRIPTION OF EMBODIMENTS

In the following, embodiments of the head-mounted image display device according to the present invention are described with reference to the drawings.

Figure 1:
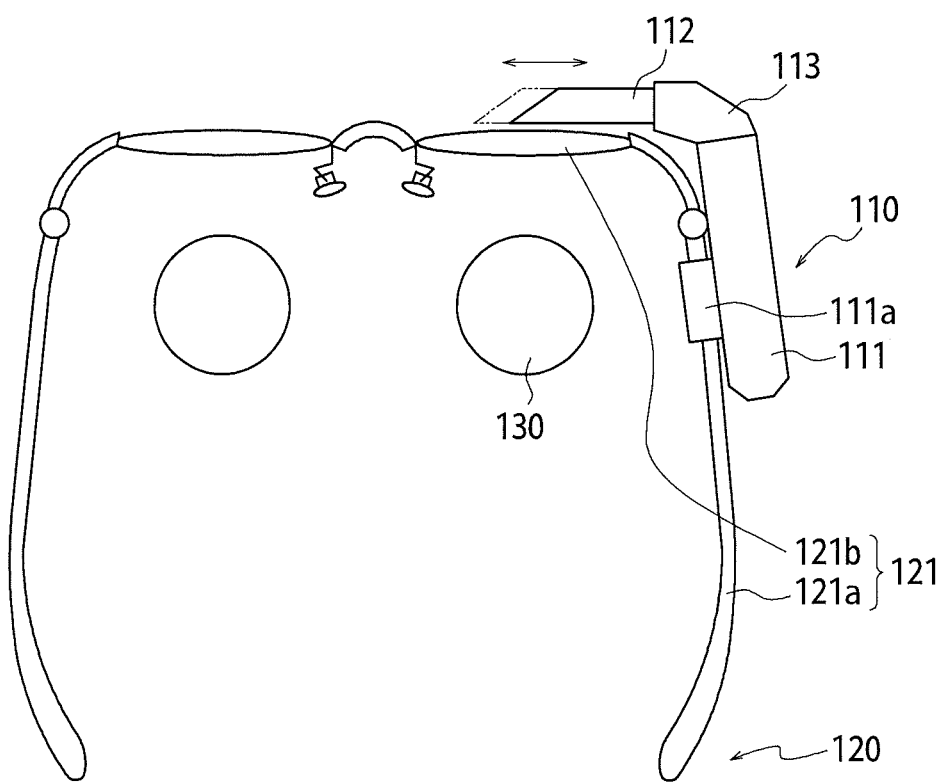
FIG. 1 is a schematic plan view illustrating a head-mounted image display device according to a first embodiment of the present invention, which is mounted onto eyeglasses.

FIG. 1 is a schematic plan view illustrating a head-mounted image display device 110 according to a first embodiment of the present invention, which is mounted onto eyeglasses 120. The head-mounted image display device 110 mainly includes a main body 111 and an eyepiece optical portion 112. The head-mounted image display device 110 is attached to the eyeglasses 120, with the main body 111 being attached, by means of a support 111a or the like, to a right side temple 121a of a frame 121 of the eyeglasses 120 to be put on the head of the wearer.

The main body 111 extends forward relative to the wearer along the frame 121 of the eyeglasses 120, and has a tip end thereof connected to the eyepiece optical portion 112 by means of an attaching portion 113 to be described later, on the side of a right eyeglass lens 121b. The eyepiece optical portion 112 extends substantially horizontally, in front of the right eyeglass lens 121b of the eyeglasses 120, from the attaching portion 113 to enter within the visual field of the wearer. As will be described later, the eyepiece optical portion 112 guides an image light beam emitted from the main body 111 and emits the image light beam from an exit window at the tip end thereof toward an eyeball 130.

Figure 2:
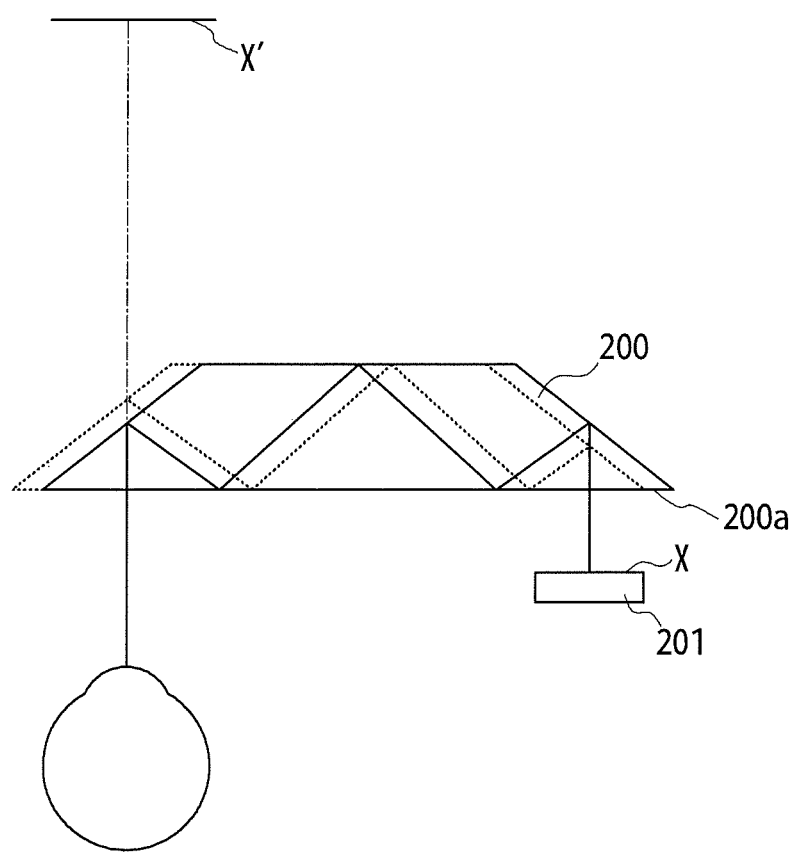
FIG. 2 is a schematic view illustrating a position where a virtual image is formed when a light-guide portion is moved relative to a fixed display element.
Figure 3:
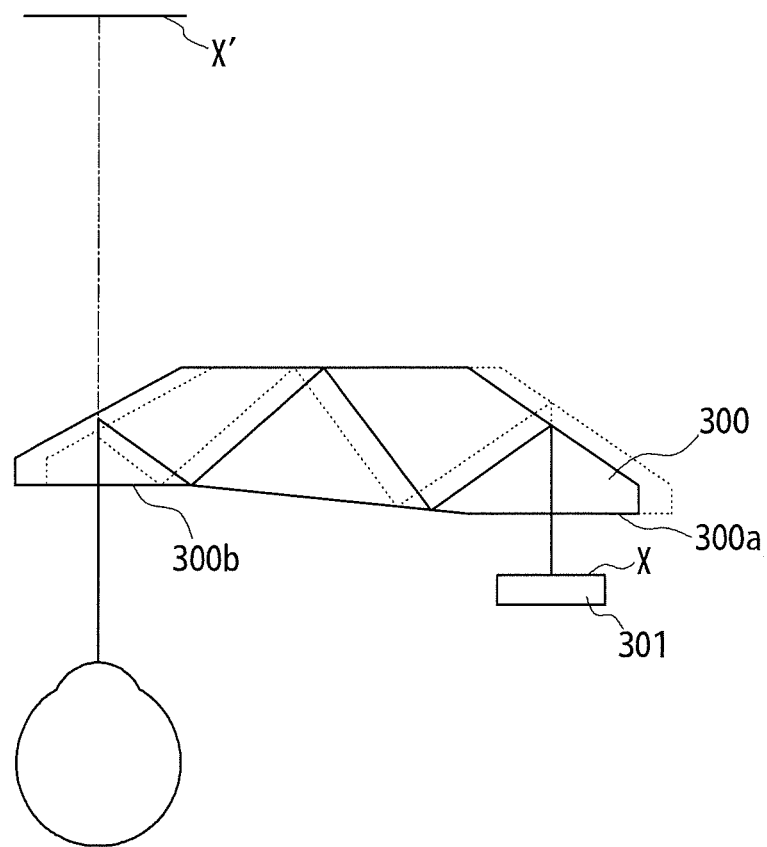
FIG. 3 is a schematic view illustrating a position where a virtual image is formed when a light-guide portion is moved relative to a fixed display element.
Figure 4:
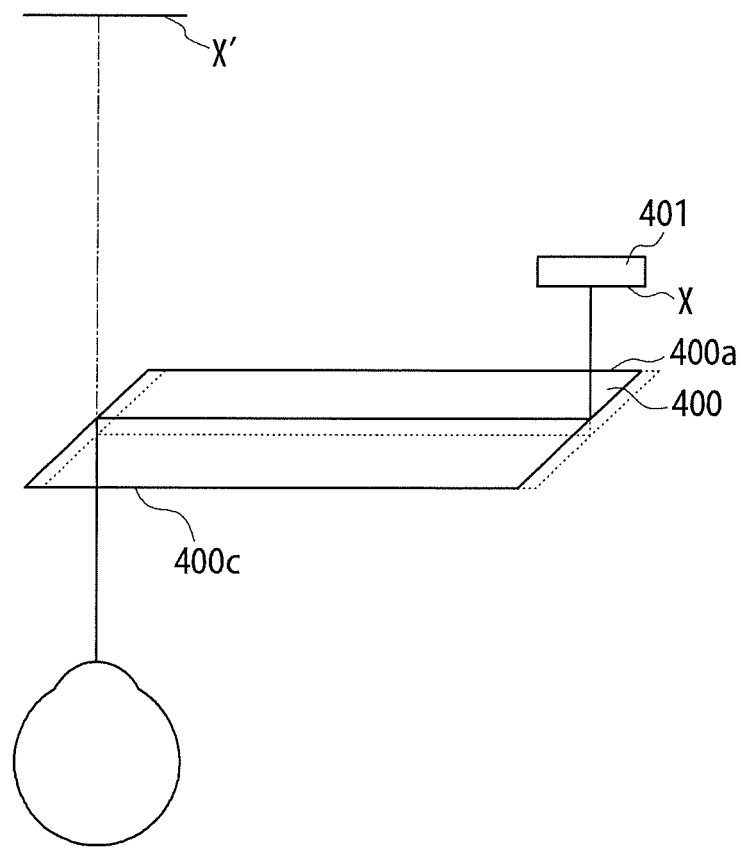
FIG. 4 is a schematic view illustrating a position where a virtual image is formed when a light-guide portion is moved relative to a fixed display element.

The behavior of an image light beam in the eyepiece optical portion 112 is described in detail. FIGS. 2 to 4 each illustrate a position where a virtual image is formed when a light-guide portion 200, 300, or 400 (corresponding to eyepiece optical portion 112) formed of a bar-shaped prism is used and the prism is moved relative to a display element 201, 301, or 401 (located in the main body 111) emitting an image light beam. In the drawings, the solid line and the dotted line each illustrate the configuration and the optical path before and after the movement, respectively.

It has been generally considered that the position of a virtual image to be formed by a reflection surface is shifted along with the movement of the reflection surface. However, studies made by the inventors of the present invention revealed that, as illustrated in FIG. 2, the position of a virtual image X' remains unchanged despite the movement of the light-guide portion 200 as long as the light-guide portion 200 has an odd number (five in FIG. 2) of reflection surfaces and an image light beam that has been incident on one surface 200a of the light-guide portion 200 is emitted from the same surface 200a as the one surface 200a. Similarly, as illustrated in FIG. 3, the position of the virtual image X' remains unchanged despite the movement of the light-guide portion 300 as long as the light-guide portion 300 has an odd number (five in FIG. 3) of reflection surfaces and an image light beam that has been incident on one surface 300a of the light-guide portion 300 is emitted from a surface 300b on the same side as the one surface 300a. Further, as illustrated in FIG. 4, the position of the virtual image X' remains unchanged despite the movement of the light-guide portion 400 as long as the light-guide portion 400 has an even number (two in FIG. 2) of reflection surfaces and an incident light beam that has been incident on one surface 400a of the light-guide portion 400 is emitted from another surface 400c of the light-guide portion 400. All of these optical systems each function as an afocal optical system which produces an image that has the same orientation vertically and horizontally at 1 magnification.

The number of reflection surfaces herein refers to the number of times the image light beam is reflected by the surfaces of the light-guide portion, rather than the number of surfaces of the light-guide portion for reflecting the image light beam. For example, in FIG. 2, the image light beam is reflected five times within the light-guide portion, with the second reflection and the fourth reflection taking place on the same surface of the light-guide portion. In this case, the second and fourth reflections are counted as twice, to thereby define that the light-guide portion has five reflection surfaces in total. The same applies hereinafter.

As illustrated in FIGS. 2 to 4, when the light-guide portions 200, 300, and 400 are moved with the display elements 201, 301, and 401 being fixed, the virtual image X' of the image X can be seen through the light-guide portion as being fixed in space and the position thereof remains unchanged.

Figure 5:
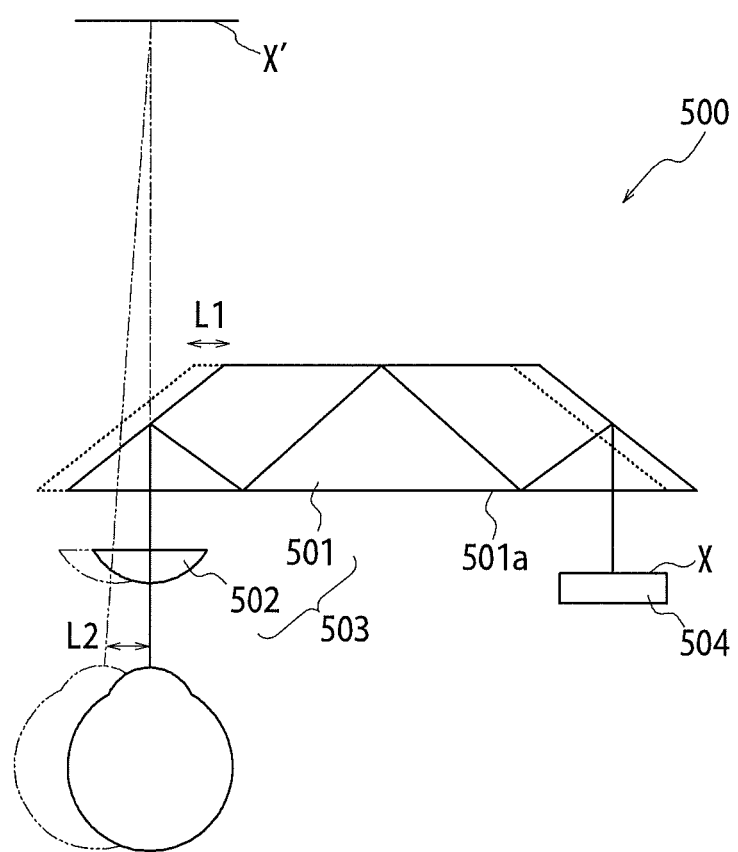
FIG. 5 is a schematic view illustrating the head-mounted image display device according to the first embodiment of the present invention.

FIG. 5 illustrates, by way of example, a head-mounted image display device 500 which includes an eyepiece optical portion 503 having an eyepiece lens 502 with a positive refractive power, the eyepiece optical portion 503 being disposed on a surface 501a emitting an image light beam. The light-guide portion 501 has an odd number (five in FIG. 5) of reflection surfaces, and an image light beam that has been incident on one surface 501a of the light-guide portion 501 is emitted from the same surface 501a as the one surface 501a of the light-guide portion 501. However, on the one surface 501a of the light-guide portion 501, the image light beam is emitted from a region different from a region where the image light beam is incident. In the drawing, the solid line and the dotted line each illustrate the configuration and the optical path before and after the movement, respectively, and the eyepiece optical portion 503 including the light-guide portion 501 and the eyepiece lens 502 is moved substantially parallel to the display element 504 which remains fixed in the main body 111. Examples of the display element 504 include a liquid crystal display (LCD) and an organic EL display. This optical system functions as an afocal optical system which produces an image that has the same orientation vertically and horizontally at 1 magnification.

As is apparent from FIG. 5, this configuration makes larger the moving distance L2 of a light flux on the eye pupil of the wearer, the light flux being emitted by the eyepiece lens, as compared to the moving distance L1 of the light-guide portion 501 and the eyepiece lens 502. In other words, a small mechanical adjustment can produce a great effect of adjusting the interpupillary distance.

According to this embodiment, the attaching portion 113 connecting the main body 111 and the eyepiece optical portion 112 has a movement mechanism for moving the eyepiece optical portion 112 relative to the main body 111 so as to adjust the position of the exit pupil of the eyepiece optical portion 112, 503, which can provide a head-mounted image display device 110 that is compact in size and simple in mechanism while producing a profound effect of adjusting the position of the exit pupil.

Figure 6:
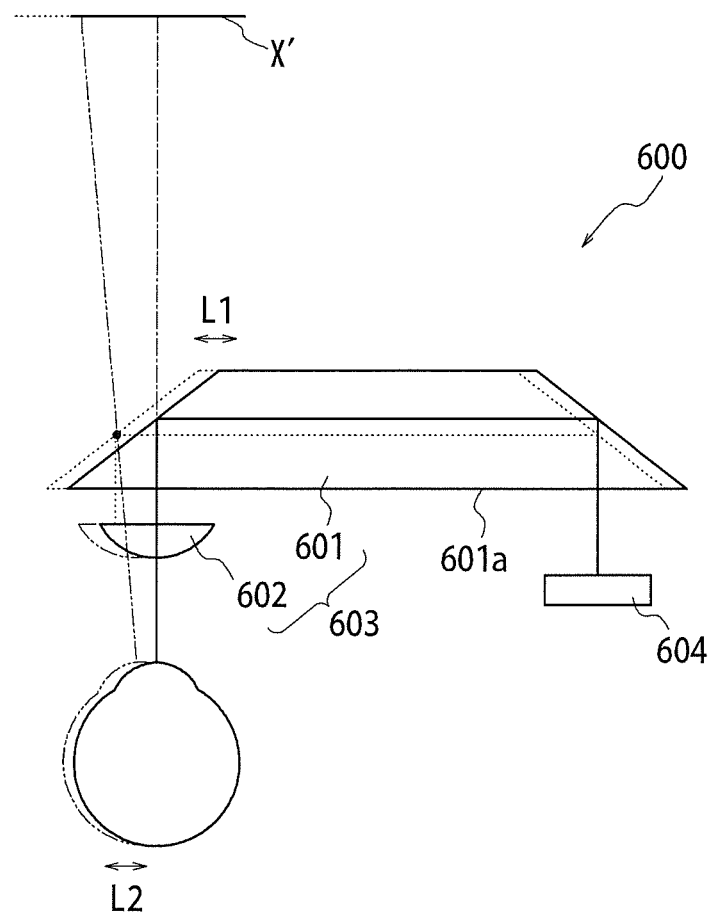
FIG. 6 is a schematic view illustrating a head-mounted image display device according to a second embodiment of the present invention.

FIG. 6 is a view of a second embodiment of the present invention, which illustrates a head-mounted image display device 600 which includes an eyepiece optical portion 603 having an eyepiece lens 602 with a positive refractive power, the eyepiece optical portion 603 being disposed on a surface 601a emitting an image light beam. The light-guide portion 601 has an even number (two in FIG. 6) of reflection surfaces, and an image light beam that has been incident on one surface 601a of the light-guide portion 601 is emitted from the same surface 601a as the one surface 601a of the light-guide portion 601. In the drawing, the solid line and the dotted line each illustrate the configuration and the optical path before and after the movement, respectively, and the eyepiece optical portion 603 including the light-guide portion 601 and the eyepiece lens 602 is moved substantially parallel to the display element 604 which is disposed as being fixed.

As is apparent from FIG. 6, the optical system function as an afocal optical system with −1 magnification. In this case, unlike the aforementioned cases, it should be noted that the virtual image X' is also changed in position similarly to the eyepiece optical portion that has been moved, in the same plane. Therefore, as illustrated in FIG. 6, the moving distance L2 of a light flux on the eye pupil of the wearer, the light flux being emitted by the eyepiece lens 602, is smaller than the moving distance L1 of the light-guide portion 601 and the eyepiece lens 602.

FIG. 7 are schematic views each illustrating the attaching portion 113 for connecting the main body 111 and the eyepiece optical portion 112 illustrated in FIG. 1. FIG. 7(a) each are a front view of the mechanism before and after being moved, which is viewed from a side facing the wearer of FIG. 1, and FIG. 7(b) each are a top view of the mechanism before and after being moved, which is viewed from the head side of the wearer of FIG. 1. The movement mechanism is configured as follows. That is, for example, the attaching portion 113 has a slide guide 115 in a concave shape formed therein and the light-guide portion 112 has a slide guide 116 in a convex shape formed on a surface not serving as an optical surface thereof, so that the light-guide portion 112 can be moved with the slide guide 116 being engaged with the slide guide 115. At this time, the display element 114 stays the same position.

Figure 8:
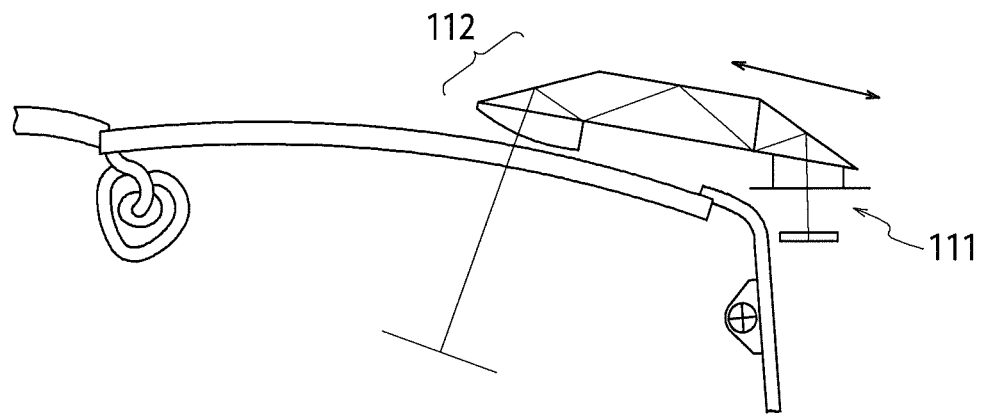
FIG. 8 is a schematic view illustrating a head-mounted image display device according to a third embodiment of the present invention.

The attaching portion 113 of FIG. 7 is illustrated by taking a case where the optical axis of the image light beam is perpendicular to a plane of incidence of the light-guide portion 112. However, an eyeglass lens is generally curved, and thus there is a fear that the eyepiece optical portion 112 may interfere with the eyeglass when moved. Meanwhile, the display element 114 is preferably configured to face substantially front, in view of securing a space for arranging a backlight or the like and of making it easy to assemble the display element 114 inside the main body. Therefore, the eyepiece optical portion 112 is moved diagonally relative to a plane having, as a normal thereof, an optical axis of light emitted from the display element 114 to be incident onto the eyepiece optical portion 112, to thereby allow the eyepiece optical portion 112 to move without interfering with the eyeglass lens. In view of this, as in a third embodiment illustrated in FIG. 8, the eyepiece optical portion 112 can be arranged at an angle larger than 90° relative to the main body 111, to thereby effectively prevent interference with the eyeglass lens. At this time, it is preferred to dispose a prism between the light-guide portion and the main body for adjusting the angle.

Figure 9:
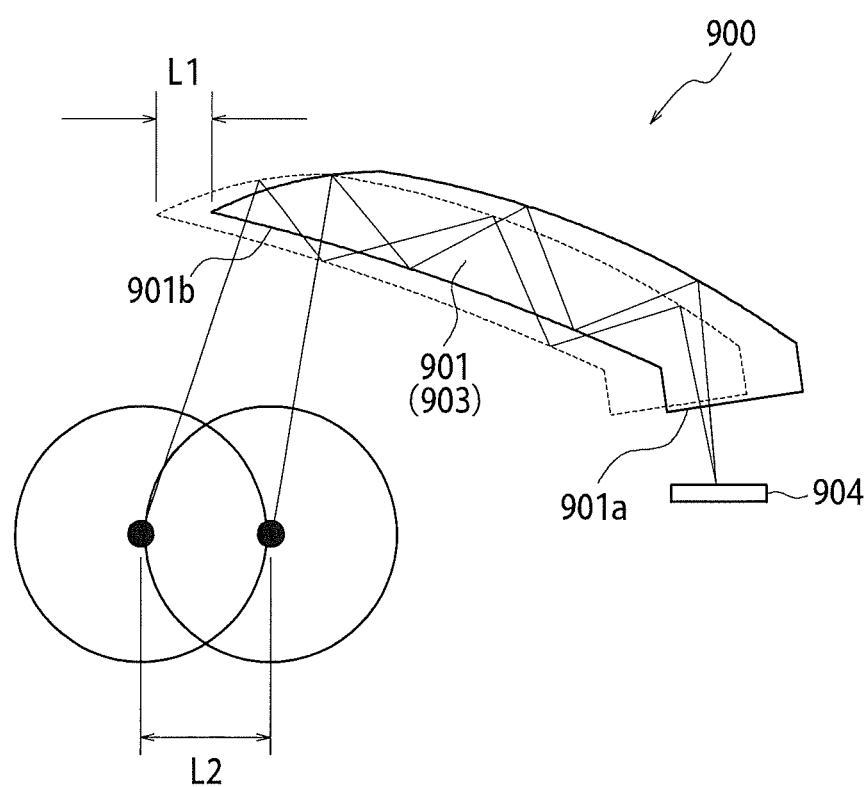
FIG. 9 is a schematic view illustrating a head-mounted image display device according to a fourth embodiment of the present invention.

FIG. 9 is a view of a fourth embodiment of the present invention, which illustrates a head-mounted image display device 900 including a light-guide portion 901 formed of a free-form-surface prism having a positive refractive power. In the head-mounted image display device 900, the light-guide portion 901 has an odd number (five in FIG. 9) of reflection surfaces, and an image light beam that has been incident on one surface 901a of the light-guide portion 901 is emitted from a surface 901a on the same side as the one surface 901a. In the drawing, the solid line and the dotted line each illustrate the configuration and the optical path before and after the movement, respectively, and the light-guide portion 901 (eyepiece optical portion 903) is moved relative to the display element 904 which remains fixed.

As is apparent from FIG. 9, this configuration also makes larger the moving distance L2 of a light flux on the eye pupil of the wearer, the light flux being emitted by the light-guide portion 901, as compared to the moving distance L1 of the light-guide portion 901, as in the example illustrated in FIG. 5. In other words, a small mechanical adjustment can produce a great effect of adjusting the interpupillary distance.

Figure 10:
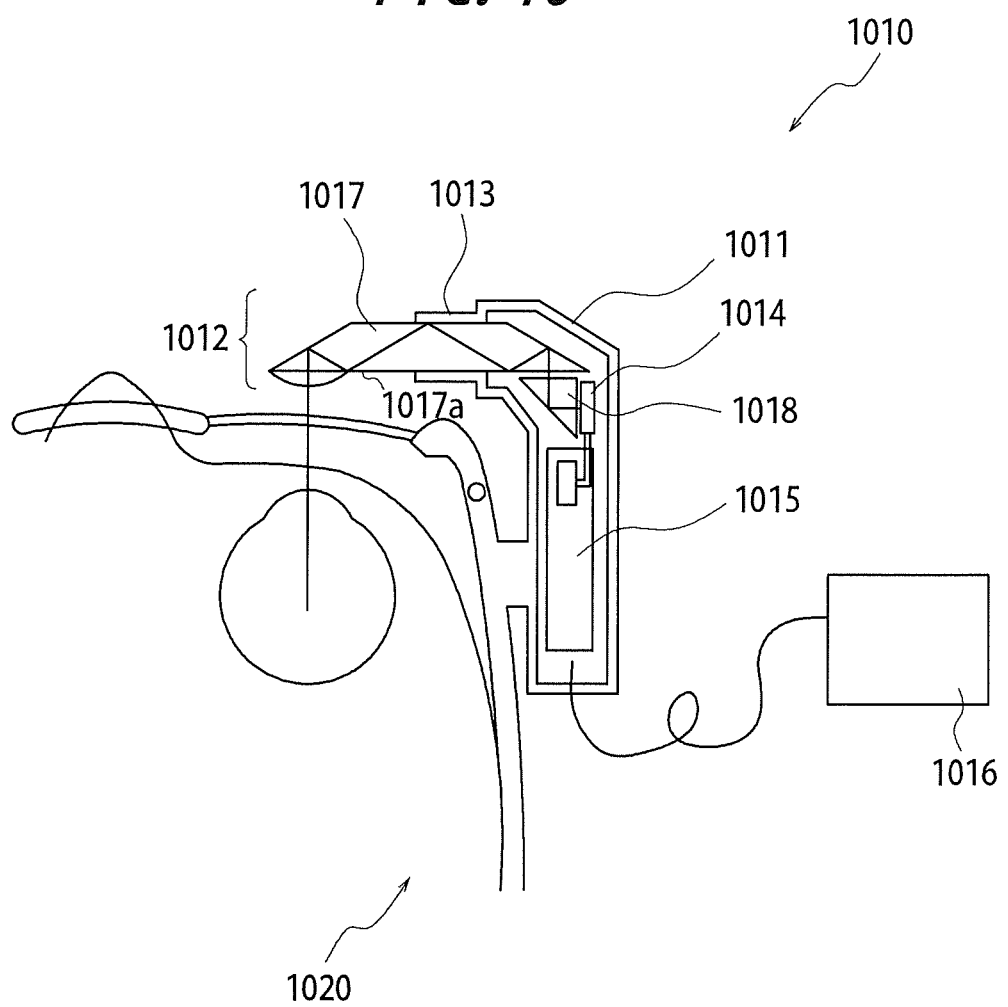
FIG. 10 is a schematic view illustrating a head-mounted image display device according to a fifth embodiment of the present invention.

FIG. 10 is a schematic plan view of a head-mounted image display device 1010 according to a fifth embodiment of the present invention, which is mounted onto eyeglasses 1020. The head-mounted image display device 1010 mainly includes a main body 1011, an eyepiece optical portion 1012, and an attaching portion 1013, the attaching portion 1013 having a movement mechanism similar to the one illustrated in FIG. 7. The main body 1011 includes, inside thereof: a display element 1014; a display element drive circuit 1015 which is connected to the display element 1014 via a flexible cable; and a video signal generator 1016 connected to the display element drive circuit 1015 via a cable. The eyepiece optical portion 1012 includes a light-guide portion 1017 formed of a prism which has an odd number of reflection surfaces, and an image light beam that has been incident on one surface 1017a of the light-guide portion 1017 is emitted from the one surface 1017a. In this embodiment, an image light beam emitted from the display element 1014 is incident on the light-guide portion 1017 via a right-angle prism 1018 and guided. The display element 1014 and the right-angle prism 1018 are fixed inside the main body 1011.

Figure 11:
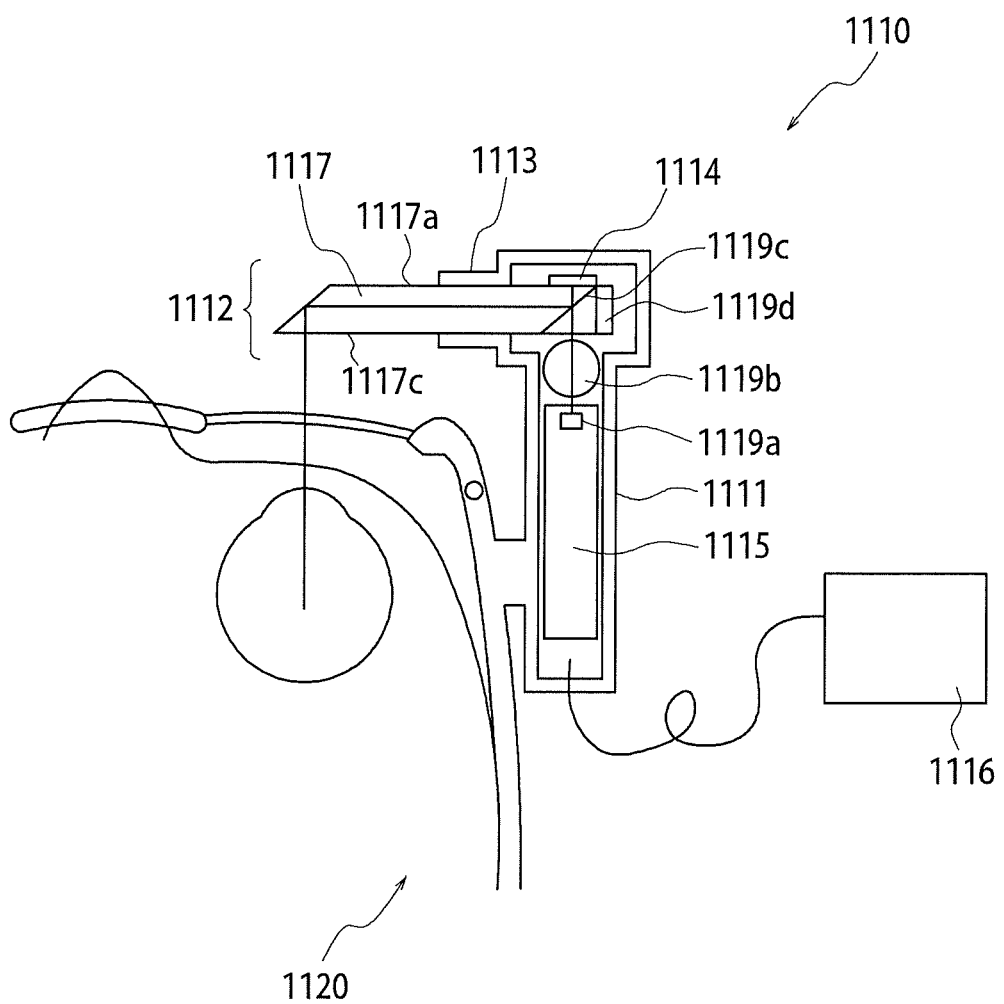
FIG. 11 is a schematic view illustrating a head-mounted image display device according to a sixth embodiment of the present invention.

FIG. 11 is a schematic play view illustrating a head-mounted image display device 1110 according to a sixth embodiment of the present invention, which is mounted onto eyeglasses 1120. The head-mounted image display device 1110 mainly includes: a main body 1111, an eyepiece optical portion 1112, and an attaching portion 1113, the attaching portion 1113 having a movement mechanism as illustrated in FIG. 7. The main body 1111 includes, inside thereof: a display element 1114 formed of a reflective LCD; a light source drive circuit 1115 and a display element drive circuit connected to the display element 1114 via a flexible cable (not shown); a video signal generator 1116 connected to the display element drive circuit and the light source drive circuit 1115 via a cable; an LED 1119a serving as a light source for illuminating the display element 1114; and a ball lens 1119b for collimating illumination light from the LED 1119a. The eyepiece optical portion 1112 includes a light-guide portion 1117 formed of a prism which has an even number of reflection surfaces, and an image light beam that has been incident on one surface 1117a of the light-guide portion 1117 is emitted from another surface 1117c. In this embodiment, an image light beam emitted from the display element 1114 is guided via a polarization beam splitter 1119c. An optical trap 1119d absorbs illumination light reflected by the polarization beam splitter, to thereby alleviate flare. Even in this case, the components other than the eyepiece optical portion 1112 are fixed inside the main body 1111.

Figure 12:
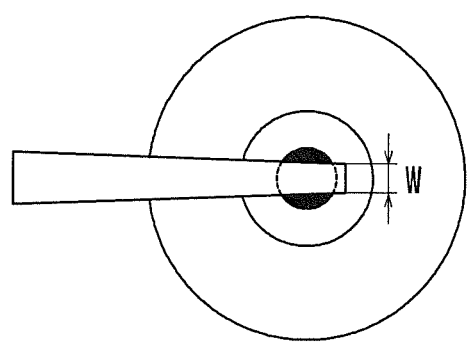
FIG. 12 is a schematic view illustrating a relation between a head-mounted image display device according to a seventh embodiment of the present invention and an eye pupil of an eyeball of the wearer.
Figure 13:
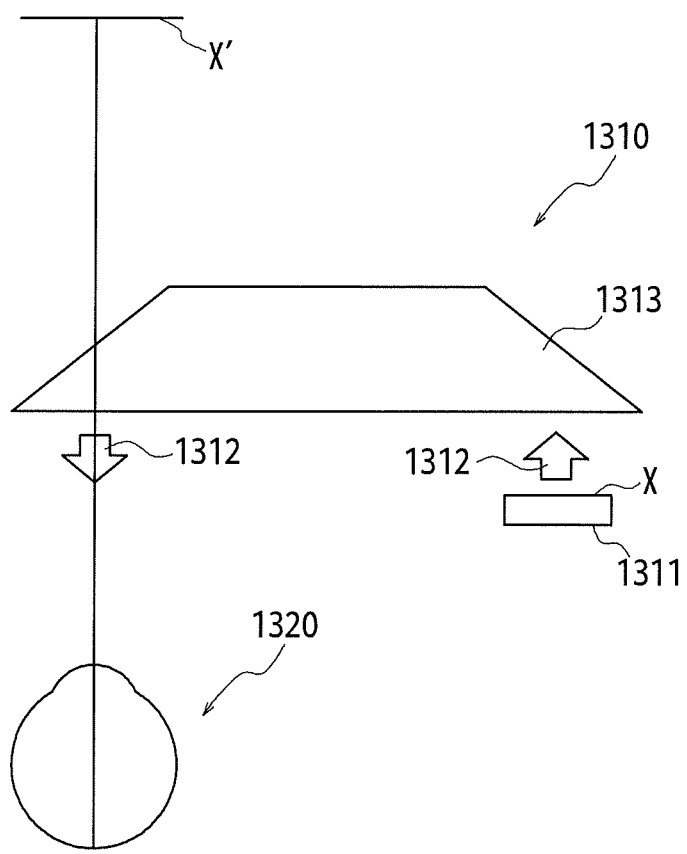
FIG. 13 is a schematic view illustrating a mechanism of a general head-mounted image display device.
Figure 14:
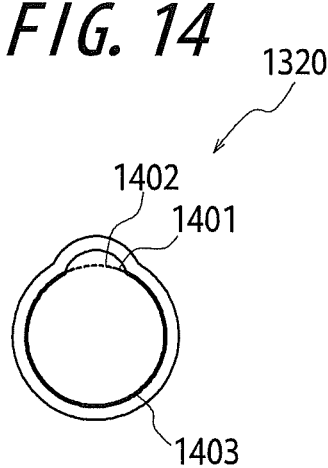
FIG. 14 is a schematic view illustrating an eyeball of a human.

It should be noted that the present invention is not limited to the above-mentioned embodiments, and may be subjected to various modifications and alterations. For example, the device illustrated in the drawings including FIG. 1 is for the right eye, but may be configured as the one for the left eye or for both eyes. Further, the device may be configured, as illustrated in FIG. 12, to have an eyepiece optical portion that is smaller in width W at the tip thereof than a pupil diameter of a human which is 4 mm in a normal environment, to thereby allow the image to be observed as a see-through image where the background can be seen. Further, the movement mechanism of the present invention is not limited to the aforementioned embodiments, and may be subjected to various modifications and alterations.

REFERENCE SIGNS LIST 110 head-mounted image display device
111 main body
112 eyepiece optical portion
113 connecting portion
120 eyeglasses
130 eyeball

The invention claimed is:

1. A head-mounted image display device, comprising:
a main body comprising a display element for emitting an image light beam, the main body incorporating a display element;
an eyepiece optical portion having a light-guide portion in a polyhedral shape, the eyepiece optical portion allowing the image light beam emitted from the main body to be incident on one surface of the light-guide portion and causing the image light beam incident on the one surface of the light-guide portion to be emitted from a surface on the same side surface as the one surface;
an attaching portion for connecting the main body and the eyepiece optical portion,
wherein the attaching portion has a movement mechanism for moving the eyepiece optical portion relative to the display element of the main body to thereby adjust the position of an exit pupil of the eyepiece optical portion;
wherein the light-guide portion has an odd number of reflection surfaces; and the eyepiece optical portion has a positive refractive power.

2. The head-mounted image display device according to claim 1, wherein the eyepiece optical portion has, on the surface of the light-guide portion from which the image light beam is emitted, an eyepiece lens having a positive refractive power.

3. The head-mounted image display device according to claim 1, wherein the light-guide portion is formed of a free-form prism having the positive refractive power.

4. The head-mounted image display device according to claim 1, wherein the eyepiece optical portion is smaller in width of a projected cross section in the direction of the visual axis of a wearer wearing the device, than a pupil of an eyeball of the wearer.

* * * * *